(12) United States Patent
Suzuki et al.

(10) Patent No.: US 10,254,625 B2
(45) Date of Patent: Apr. 9, 2019

(54) OPTICAL SIGNAL PROCESSING DEVICE

(71) Applicant: NIPPON TELEGRAPH AND TELEPHONE CORPORATION, Chiyoda-ku, Tokyo (JP)

(72) Inventors: Kenya Suzuki, Atsugi (JP); Kei Kuwabara, Atsugi (JP); Yuichi Higuchi, Atsugi (JP); Mitsumasa Nakajima, Atsugi (JP); Yuichiro Ikuma, Atsugi (JP); Osamu Moriwaki, Atsugi (JP); Tetsuo Takahashi, Atsugi (JP); Naoki Ooba, Yokohama (JP); Yuzo Ishii, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/568,755

(22) PCT Filed: Apr. 28, 2016

(86) PCT No.: PCT/JP2016/002242
§ 371 (c)(1),
(2) Date: Oct. 23, 2017

(87) PCT Pub. No.: WO2016/174876
PCT Pub. Date: Nov. 3, 2016

(65) Prior Publication Data
US 2018/0164656 A1 Jun. 14, 2018

(30) Foreign Application Priority Data
Apr. 28, 2015 (JP) .................... 2015-092217

(51) Int. Cl.
*G02F 1/313* (2006.01)
*G02F 1/31* (2006.01)

(52) U.S. Cl.
CPC .............. *G02F 1/3133* (2013.01); *G02F 1/31* (2013.01); *G02F 1/313* (2013.01); *G02F 1/3137* (2013.01); *G02F 2001/3135* (2013.01)

(58) Field of Classification Search
CPC ................. G02F 1/3133; G02F 1/3137; G02F 2001/3135
See application file for complete search history.

(56) References Cited

U.S. PATENT DOCUMENTS 7,027,684 B2 * 4/2006 Ducellier ........... G02B 6/12011
385/15
9,329,345 B2 * 5/2016 Bolle .................... G02B 6/2938
(Continued)

FOREIGN PATENT DOCUMENTS

| JP | 2009-134192 A | 6/2009 |
|----|---------------|--------|
| WO | 2013/038713 A1 | 3/2013 |
| WO | 2015/008489 A1 | 1/2015 |

OTHER PUBLICATIONS

Ikuma et al, 8×24 Wavelength Selective Switch for Low-loss Transponder Aggregator, Optical Fiber Communication Conference 2015, Mar. 22, 2015, Th5A.4.*

(Continued)

*Primary Examiner* — Ryan A Lepisto
(74) *Attorney, Agent, or Firm* — Workman Nydegger

(57) ABSTRACT

An optical signal processing device with a transponder aggregator function by which theoretical loss is not increased even if the number of necessary transponders is increased. Optical signals inputted from input ports are inputted to a PLC. The PLC has SBTs. The input ports are connected to the input-end SBT, and a plane wave is outputted from an output end of the PLC to the space side at an angle different for each input port. Optical signals outputted by the PLC are changed in their optical paths on the x-z plane by a cylindrical lens (Lsp) designed to refract (Continued)

optical signals in the x-axis direction, and are reflected by an LCOS at different regions corresponding to the positions of the input port. The reflected optical signals are incident on the output-end SBTs on the PLC, and are outputted to output ports via demultiplex parts.

15 Claims, 9 Drawing Sheets

(56) References Cited

U.S. PATENT DOCUMENTS

2014/0205291 A1 7/2014 Suzuki et al.
2016/0197695 A1 7/2016 Seno et al.

OTHER PUBLICATIONS

Thierry Zami, *High Degree Optical Cross-Connect Based on Multicast Switch*, Optical Society of America, 2014, pp. 3.

Toshio Watanabe et al., *Reconfigurable Optical Add/Drop Multiplexer*, NTT Photonics Laboratories, Nov. 2015, pp. 25-28.
Kazunori Seno et al., *Spatial Beam Transformer for Wavelength Selective Switch Consisting of Silica-Based Planar Lightwave Circuit*, IEICE Technical Repot. CPM, Component Parts and Materials, Aug. 16, 2012, vol. 112, No. 182, pp. 127-132.
Yuichiro Ikuma et al., *8×24 Wavelength Selective Switch for Low-loss Transponder Aggregator*, 2015 Optical Fiber Communications Conference and Exhibition (OFC), Mar. 22, 2015, Th5A.4, pp. 3.
International Search Report dated Aug. 2, 2016, issued in PCT Application No. PCT/JP2016/002242, filed Apr. 28, 2016.
International Preliminary Report on Patentability dated Oct. 31, 2017, issued in PCT Application No. PCT/JP2016/002242, filed Apr. 28, 2016.
Okuno, M., Highly Integrated PLC-Type Optical Switches for OADM andOXC Systems, Optical Fiber Communications Conference 2003, U.S.A, IEEE, Mar. 28, 2003, vol. 1,TuEl, pp. 169-170.

* cited by examiner

OPTICAL SIGNAL PROCESSING DEVICE

TECHNICAL FIELD

The present invention relates to an optical signal processing device used in an optical communication network.

BACKGROUND ART

With the explosive spread of data communication networks such as the Internet, there are increasing needs for expanding the capacity of optical communication networks. To meet such growing network demands, wavelength-division multiplexing is in practical use, and in recent years, there have also been growing demands for wavelength selective switching (WSS), which enables route switching of optical signals on a per-wavelength basis without converting the optical signals into electrical signals. The node configuration using wavelength selective switching is called a reconfigurable optical add/drop multiplexing (ROADM) system.

Recently, a node configuration called multi-degree ROADM (see NPL 1) that processes optical signals from various routes has particularly been researched and developed actively, and multi-degree ROADM is beginning to be used in actual communication systems.

A large number of optical signals may be dropped at nodes of such systems, and to process such signals, a configuration which employs multicast switching as a transponder aggregator (TPA) has been designed. A transponder aggregator may connect optical signals from given routes to given transponders.

CITATION LIST

Non Patent Literature

NPL 1: T. Zami, "High degree optical cross-connect based on multicast switch," Optical Fiber Communication Conf. 2014 (OFC2014), W2A.36, March 2014

NPL 2: Watanabe, Suzuki, Takahashi, "Multicast Switching Technology for improving Operability of ROADM," NTT Technical Journal, Vol. 25, No. 11, pp. 25 to 28, 2013

NPL 3: K. Seno, K. Suzuki, N. Ooba, T. Watanabe, M. Itoh, T. Sakamoto, T. Takahashi, "Spatial beam transformer for wavelength selective switch consisting of silica-based planer lightwave circuit," Optical Fiber Communication Conf. 2012 (OFC2012), JTh2A.5, March 2012

SUMMARY OF INVENTION

The conventional configuration using multicast switching, however, has its limit in increasing the number of connectable transponders. This is because multicast switching inherently produces theoretical loss, and the loss increases with 3×log 2N (dB) where N is the number of transponders connected. In a conventional multicast switching configuration, an optical signal is branched (Broadcast) and then selected by a switch (Select), and signal loss due to the branching is inevitable (see NPL 2). In a method proposed and typically used for compensating for such loss, an optical amplifier or the like is inserted, which however increases the costs by the addition of the optical amplifier.

The present invention has been made in view of such problems, and aims to provide an optical signal processing device including a transponder aggregator that does not increase theoretical loss even if the number of necessary transponders is increased.

To solve the above problems, an aspect of the present invention is an optical signal processing device, comprising: M input ports (where M is an integer of 2 or more); a first spatial beam transformer that emits optical signals inputted to the M input ports, in directions different for the respective input ports; a deflector capable of deflecting optical signals emitted from the first spatial beam transformer according to which of incident regions on the deflector the optical signals have been incident on; N second spatial beam transformers (where N is an integer of 2 or more) that each demultiplex an optical signal emitted from the deflector into M waveguides according to an angle of incidence; and N or less optical multiplex units that each multiplexes optical signals from the M waveguides of each of the second spatial beam transformers and output the multiplexed optical signal from a single output port.

Another aspect of the present invention is an optical signal processing device, comprising: M input ports (where M is an integer of 2 or more); a first spatial beam transformer that emits optical signals inputted to the M input ports, in directions different for the respective input ports; a deflector capable of deflecting optical signals emitted from the first spatial beam transformer according to which of incident regions on the deflector the optical signals have been incident on; N second spatial beam transformer (where N is an integer of 2 or more) that each demultiplex an optical signal emitted from the deflector into M waveguides according to an angle of incidence; and N or less optical multiplex units that each select an optical signal emitted from at least one of the M waveguides of each of the second spatial beam transformers and output the selected optical signal from a single output port.

Another aspect of the present invention is an optical signal processing device, comprising: M first input/output ports (where M is an integer of 2 or more); a first spatial beam transformer that includes M second input/output ports connected to the M first input ports and a first input/output terminal that emits optical signals in directions different for the respective second input/output ports; N second spatial beam transformers (where N is an integer of 2 or more) that each include M third input/output ports and a second input/output terminal that emits optical signals in directions different for the respective third input/output ports; N or less optical multiplex/demultiplex units that each include fourth input/output ports connected to the M third input/output ports of each of the second spatial beam transformers and one fifth input/output port; and a deflector capable of deflecting optical signals emitted from the first input/output terminal of the first spatial beam transformer and the second input/output terminal of each of the second spatial beam transformers according to which of incident regions on the deflector the optical signals have been incident on, and capable of optically connecting the first spatial beam transformer and the second spatial beam transformers to each other.

Another aspect of the present invention is the device further comprising a wavelength disperser disposed between the first spatial beam transformer and the deflector, and the optical signals subjected to wavelength demultiplexing by the wavelength disperser are incident on different regions on the deflector according to their respective wavelengths.

Another aspect of the present invention is wherein: the first and second spatial beam transformers each include a slab waveguide formed on a planar lightwave circuit, and a waveguide array formed by a plurality of waveguides of substantially the same length.

Another aspect of the present invention is wherein: the first and second spatial beam transformers each include a slab waveguide formed on a planar lightwave circuit, and M optical waveguides connected to the slab waveguide and oriented in such directions as to cause a beam emitted from the slab waveguide to be incident on the incident regions of the deflector.

Another aspect of the present invention wherein: each of the optical multiplex units includes a plurality of multiplexers formed on a planar lightwave circuit and connected in stages.

Another aspect of the present invention is characterized in that each of the multiplexers is an optical coupler or an optical switch.

Another aspect of the present invention is wherein: each of the optical multiplex units includes at least one optical coupler formed on a planar lightwave circuit and at least one optical switch connected to the optical coupler.

Another aspect of the present invention is wherein: when the number of optical multiplex units is N−1 or less, the M optical waveguides connected to the second spatial beam transformer to which no optical multiplex unit is connected are connected to M input ports of another optical signal processing device that is identical to the optical signal processing device.

The optical processing device of the present invention makes it possible to increase the number of aggregated transponders without increasing the theoretical loss.

BRIEF DESCRIPTION OF DRAWINGS

FIG. 6 is a diagram showing the relationship of FIG. 6A and FIG. 6B;

DESCRIPTION OF EMBODIMENTS

Embodiments of the present invention are described in detail below.

Embodiment 1

Figure 1:
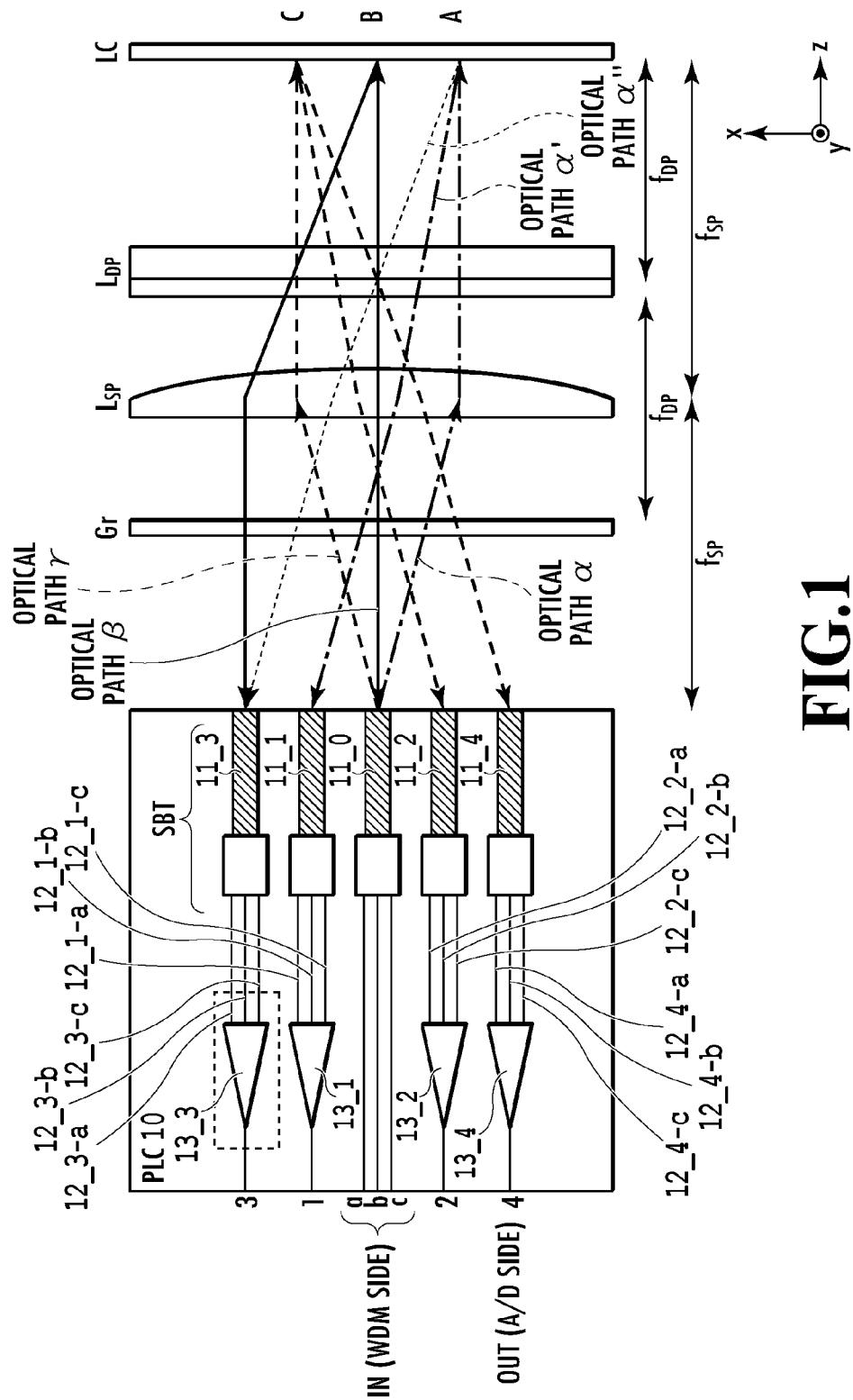
FIG. 1 is a top view illustrating an outline of the configuration of an optical signal processing device according to Embodiment 1 of the present invention.
Figure 2:
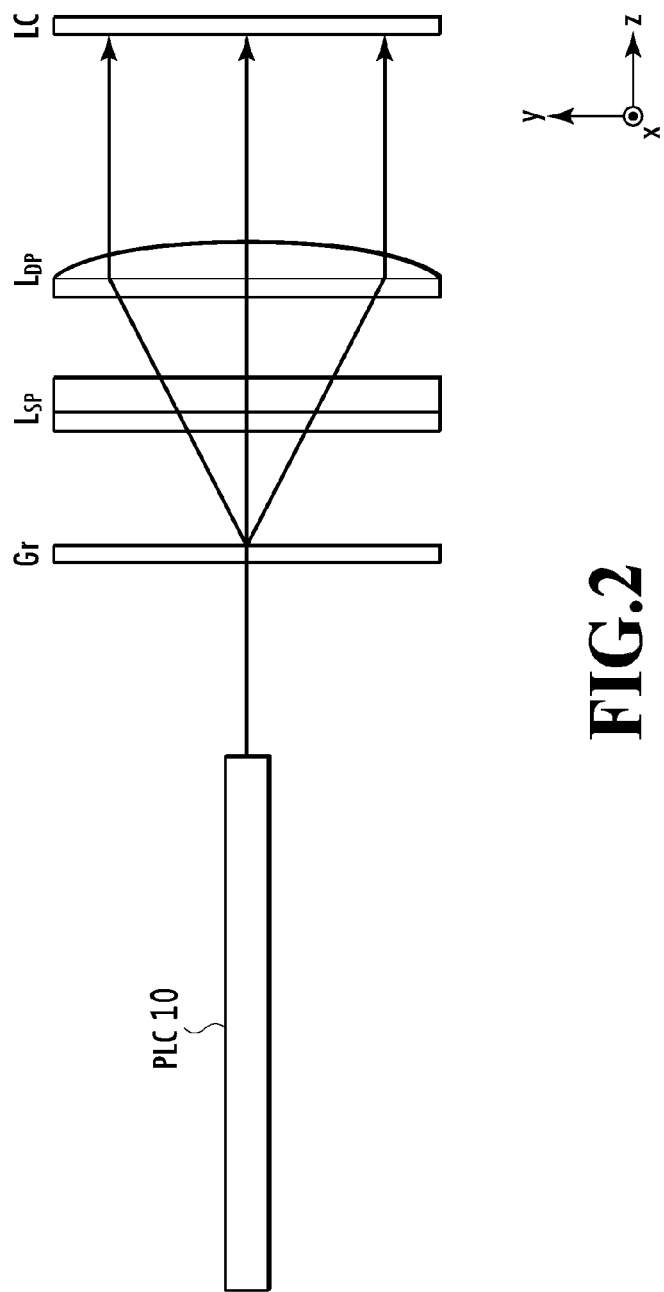
FIG. 2 is a side view illustrating an outline of the configuration of the optical signal processing device according to Embodiment 1 of the present invention.

FIGS. 1 and 2 each show an outline of the configuration of an optical signal processing device according to Embodiment 1 of the present invention. FIG. 1 is a top view seen in the y-axis direction, and FIG. 2 is a side view seen in the x-axis direction. Throughout the drawings used in the following description of the present invention, the same components are denoted by the same reference signs. In the present embodiment, M×N wavelength selective switch of M×N=3×4 is used as an example, where M is the number of inputs and N is the number of outputs. However, the numbers of inputs and outputs are obviously not limited to this example.

In FIG. 1, optical signals inputted from input ports a, b, and c denoted as IN (WDM SIDE) (M=3 in this embodiment) are inputted to a planar lightwave circuit (PLC) 10.

PLC 10 has spatial beam transformers (SBTs) 11_0 to 11_4 (see NPL 3), and the input ports a, b, and c are connected to the input-end SBT 11_0.

The SBTs 11_0 to 11_4 are each an optical circuit formed by a slab waveguide and a waveguide array. An optical signal inputted to the slab waveguide propagates while diffusing and then reaches the waveguide array. The waveguide array is formed by isolated waveguides of the same length. The optical signal reaches the emission end of PLC 10 while maintaining its wavefront, or in other words, phase relations among light waves propagating through the respective isolated waveguides. Thus, plane waves are outputted from the output end of the PLC 10 to the spatial side. Although plane waves are outputted in the present embodiment, a focused beam or a diverging beam may be outputted depending on parameters for a spatial optical system to be described below.

The optical signals entering through the inputs a, b, and c are connected to different locations on the slab waveguide in the input-end SBT 11_0, and therefore are emitted at different angles when outputted from the PLC 10. Specifically, the optical signal from the input a is outputted in the direction of an optical path α, the optical signal from the input b is outputted in the direction of an optical path β, and the optical signal from the input c is outputted in the direction of an optical path γ.

The optical signals outputted from the PLC 10 are subjected to wavelength demultiplexing in the y-axis direction by a diffraction grating Gr, are changed in their optical paths in the x-z plane by a cylindrical lens Lsp designed to refract light in the x-axis direction, and are incident on an LCOS (liquid crystal on silicon) at different regions A, B, and C corresponding respectively to the positions of the input ports a, b, and c.

At the same time, the optical signals angularly dispersed by the diffraction grating Gr on a per-wavelength basis are changed in their optical paths on the y-z plane by a cylindrical lens Ldp designed to refract light in the y-axis direction, and are incident on the LCOS at different positions in the y-axis direction according to their wavelengths.

The optical signal incident on the region A, for example, is reflected and deflected on the x-z plane at a desired angle according to the wavelength of the spectrally separated optical signal, propagates along an optical path α' through the cylindrical lenses Ldp and Lsp and the diffraction grating Gr, and then is incident on the PLC 10.

PLC 10 has the output-end SBTs 11_1 to 11_4 as many as the number of output ports (N=4). The travelling direction of an optical signal deflected by the LCOS determines which of the output-end SBTs 11_1 to 11_4 the optical signal is incident on. For instance, an optical signal travelling along the light beam α' propagates to the SBT 11_1, and an optical signal travelling along a light beam α" propagates to the SBT 11_3.

An optical signal that has been incident on any of the output-end SBTs 11_1 to 11_4 is outputted therefrom to a corresponding one of intermediate output waveguides 12_j-a to 12_j-c (j=1, 2, 3, or 4) depending on the region on the LOCOS where the optical signal has travelled through. For instance, an optical signal that has travelled through the region A and been incident on the output-end SBT 11_1 is inputted to the intermediate output waveguide 12_1-a. In other words, an optical signal is inputted to one of the intermediate output waveguides 12_j-a to 12_j-c which is determined depending on whether the optical signal has been inputted through the input a, b, or c.

The intermediate output waveguides 12_j-a to 12_j-c connected to the same output-end SBT 11_j are connected to a multiplex part 13_j that converges signals propagating through the intermediate output waveguides 12_j-a to 12_j-c.

The multiplex part 13_j propagates the optical signals from the intermediate output waveguides 12_j-a to 12_j-c to an output port by multiplexing the optical signals with a coupler or selecting from the optical signals with a switch.

Figure 3:
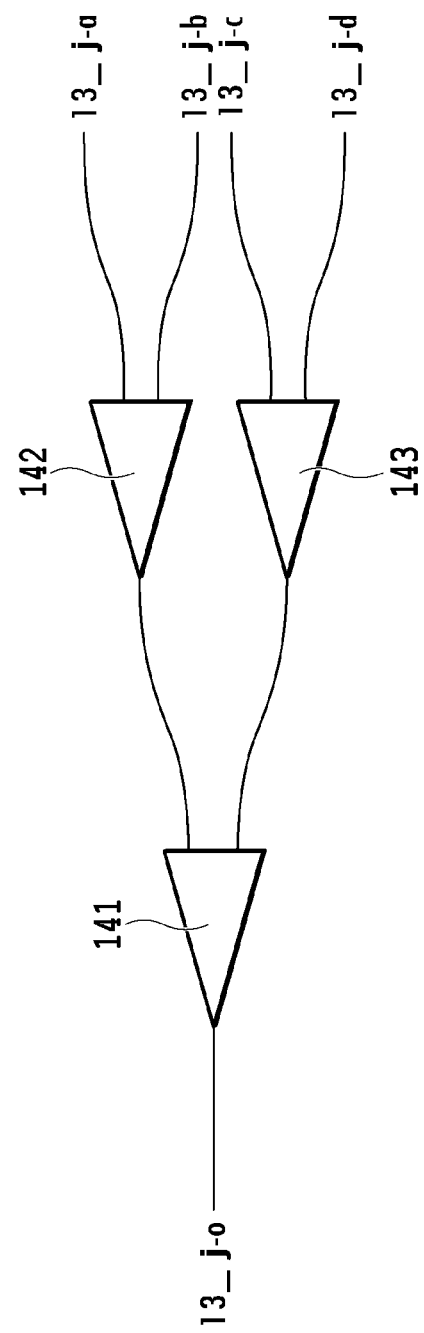
FIG. 3 is a diagram illustrating an outline of the configuration of a multiplex part of the optical signal processing device according to Embodiment 1 of the present invention.

FIG. 3 shows an outline of the multiplex part of the optical signal processing device according to Embodiment 1 of the present invention. FIG. 3 is a cutout of the part framed by the dotted-line in FIG. 1, and shows a structure where optical multiplexers 141 to 143 consisting of 2×1 Y-branching waveguides are connected in stages in a tree form. In other words, the port on the one-port end of the optical multiplexer 142 and the port on the one-port end of the optical multiplexer 143 are respectively connected to the ports on the two-port end of the optical multiplexer 141.

Ports on the two-port ends of the optical multiplexers 142 and 143 are input ports 13_j-a, 13_j-b, 13_j-c, and 13_j-d of the multiplex part 13_j, and three of them are connected to the intermediate output waveguides 12_j-a, 12_j-b, and 12_j-c. Note that j (j=1, 2, . . . , N) is the number of an output port, and corresponds to the output SBT 11_j.

Although the number of input ports is M=4 and the input ports are denoted as a, b, c, and d in FIG. 3, the number of input ports may be any other number. If the coupler shown here having four input ports (M=4) is to be used as the multiplex parts 13_1 to 13_4 of Embodiment 1, only the input ports 13_j-a, 13_j-b, and 13_j-c may be used to form a coupler of M=3.

An optical signal inputted from any of the intermediate output waveguides 12_j-a, 12_j-b, 12_j-c, and 12_j-d is multiplexed by passing through the corresponding multiplex part 13_j and then outputted from an output port 13_j-o.

A description is given below of loss in the optical signal processing device implemented with the configuration of the present embodiment.

A signal inputted from any of the intermediate output waveguides 12_j-a to 12_j-d is halved in amount of light every time it passes through each of the optical multiplexers. Thus, a loss of 3 dB occurs. Typically, in a transponder aggregator (TPA) used in the drop side, the number M of selected paths is typically smaller than the number N of connectable transponders, i.e., M<N.

In a configuration of conventional multicast switching, a theoretical loss of 3×log 2N (dB) occurs. For example, if the number N of connectable transponders is N=32, the theoretical loss is extremely large, i.e. 15 dB.

On the other hand, when an M×N switch of the configuration according to this embodiment is used for the TPA, the theoretical loss is dependent on the number M of routes in the multiplex part 13_j. The theoretical loss in Embodiment 1 is 6 dB since theoretical loss is 3×log 2M and M=4. In the present invention, a transponder to output an optical signal is selected by the LCOS determining the route taken by the optical signal, and hence the theoretical loss is not dependent on the number N of connected transponders. In the present invention, therefore, the number N of transponders is scalable without an increase in the theoretical loss.

The configuration of Embodiment 1 using a coupler is advantageous in that the PLC circuit is smaller in size than a configuration using a switch to be described later in Embodiment 2.

Although 2×1 Y-branching waveguides are used as the optical multiplexers 141 to 143 herein, it is obvious that similar effects can be attained using a directional coupler, a multi-mode interference coupler, or the like as an optical multiplexer.

Although the multiplex parts 13_1 to 13-4 have a tree-form configuration in the above example, they may have a tap-type configuration or a combination of tap-type and tree-type configurations.

Materials usable for the PLC 10 include a silica-based material, silicon, an organic material, a crystal material such as lithium niobate, or a semiconductor material such as InP. Although the configuration of the present embodiment uses the diffraction grating Gr as wavelength dispersion means, it may be configured without the wavelength dispersion means.

Embodiment 2

Figure 4:
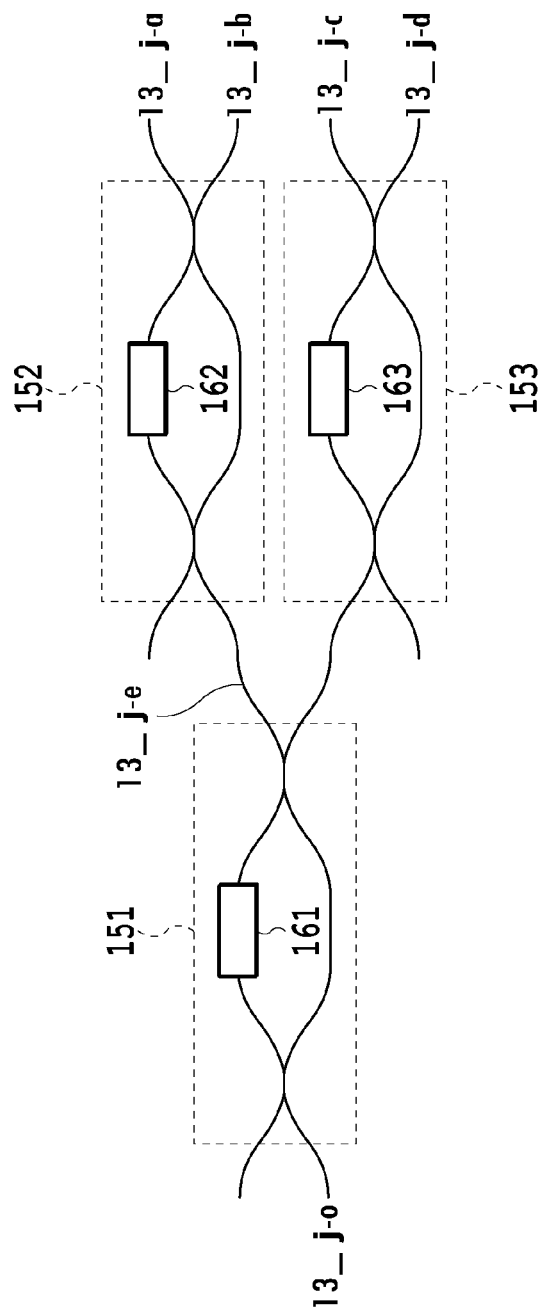
FIG. 4 is a diagram illustrating an outline of the configuration of a multiplex part of an optical signal processing device according to Embodiment 2 of the present invention.

FIG. 4 shows the configuration of a multiplex part of an optical signal processing device according to Embodiment 3 of the present invention. As in Embodiment 1, FIG. 4 is a cutout of the part in FIG. 1 framed by the dotted line. Conditions such as the number of ports are the same as those in Embodiment 1.

FIG. 4 shows an example of the configuration of the multiplex part in which a part which is formed by a 1×2 optical coupler in Embodiment 1 is formed by an optical switch using a Mach-Zehnder interferometer (MZI).

MZI optical switches 151, 152, and 153 are each formed by two 2×2 couplers, two arm waveguides between the 2×2 couplers, and a control heater 161, 162, or 163 disposed immediately above one or both of the arm waveguides. When power is applied to the control heater, the phase of light propagating immediately below the control heater is changed due to thermooptical effect, and switch is made between a cross state and a bar state. Thereby, for instance, a signal inputted from the input port 13_j-a can be outputted to the port 13_j-e, and a signal inputted from the input port 13_j-b can be outputted from the port 13_j-e.

In the MZI optical switches shown in FIG. 4, an optical signal from any of the input ports 13_j-a, 13_j-b, 13_j-c, and 13_j-d can be outputted to the output port 13_j-o without any theoretical loss.

This configuration makes the circuit size larger than that of Embodiment 1, but is advantageous in the absence of theoretical loss and in its capability of reducing crosstalk of same-wavelength signals even when the spatial optical system has crosstalk to make same-wavelength signals from different input ports less separable. The crosstalk can be reduced because an input port is selected by an optical switch on the PLC 10.

Although the multiplex parts 13_1 to 13-4 have a tree-type optical switch configuration in the above example, they are not limited to such a configuration. It is obvious that similar effects are attainable using a tree-type configuration or a combination of tree-type and tap-type configurations.

Instead of the MZI optical switches 151 to 153, optical switches of a semiconductor optical amplifier (SOA) type or an electro-absorption (EA) type made of a semiconductor material and located on an optical circuit may be used, for example.

Embodiment 3

Figure 5:
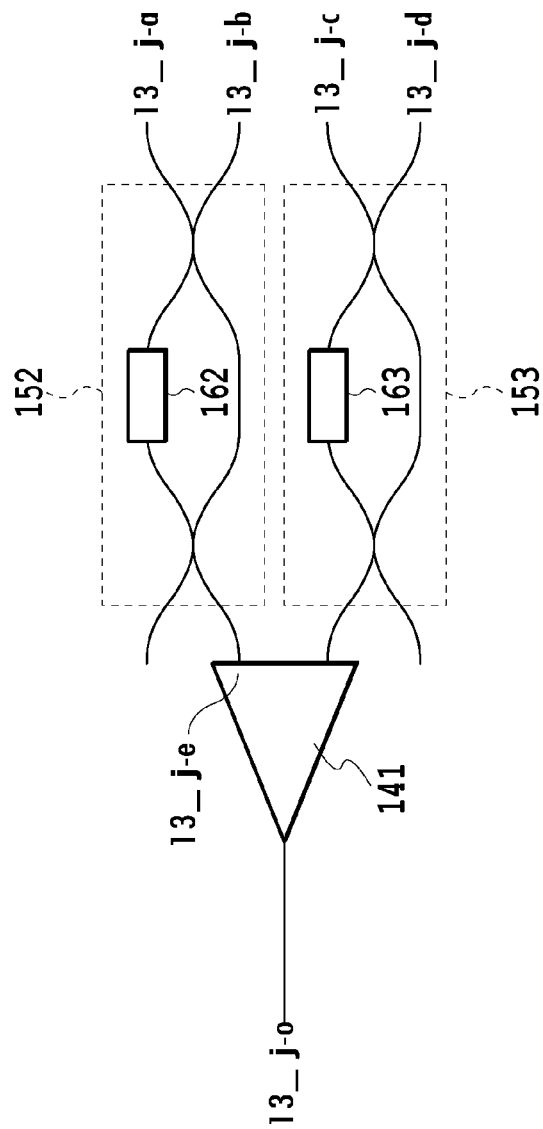
FIG. 5 is a diagram illustrating an outline of the configuration of a multiplex part of an optical signal processing device according to Embodiment 3 of the present invention.

FIG. 5 shows the configuration of a multiplex part of an optical signal processing device according to Embodiment 3 of the present invention. In this embodiment, only the stage of the multiplex part 13_j close to the intermediate output waveguide 12_j is configured with MZI optical switches, and the output-port side is configured with a 1×2 optical coupler. Specifically, one of the outputs of the MZI optical switch 152 and one of the outputs of the MZI optical switch 153 are connected to the two input ports of one 1×2 optical coupler 141. To apply this configuration to the multiplex part 13_j of Embodiment 1, the input ports 13_j-a, 13_j-b, and 13_j-c may be used to configure an M=3 multiplex part 13_j.

Advantages of this configuration are that: (1) the circuit size is not increased, (2) crosstalk of same-wavelength signals described in Embodiment 2 can be reduced, and (3) theoretical loss can be reduced more than Embodiment 1. For example, crosstalk of wavelength is the product (the sum in dB) of what is selected by the switching operation of the spatial optical system and what is selected by the MZI optical switches 152 and 153 in the waveguide even with one stage. Thus, a sufficient selection ratio can be obtained.

The theoretical loss is improved by 3 dB compared to Embodiment 1. If the number of input routes is M=4, a theoretical loss of approximately 3 dB occurs.

For example, two input ports 13_j-a and 13_j-c may be used to obtain an M=2 multiplex part that reduces crosstalk of same-wavelength signals.

Embodiment 4

Figure 6A:
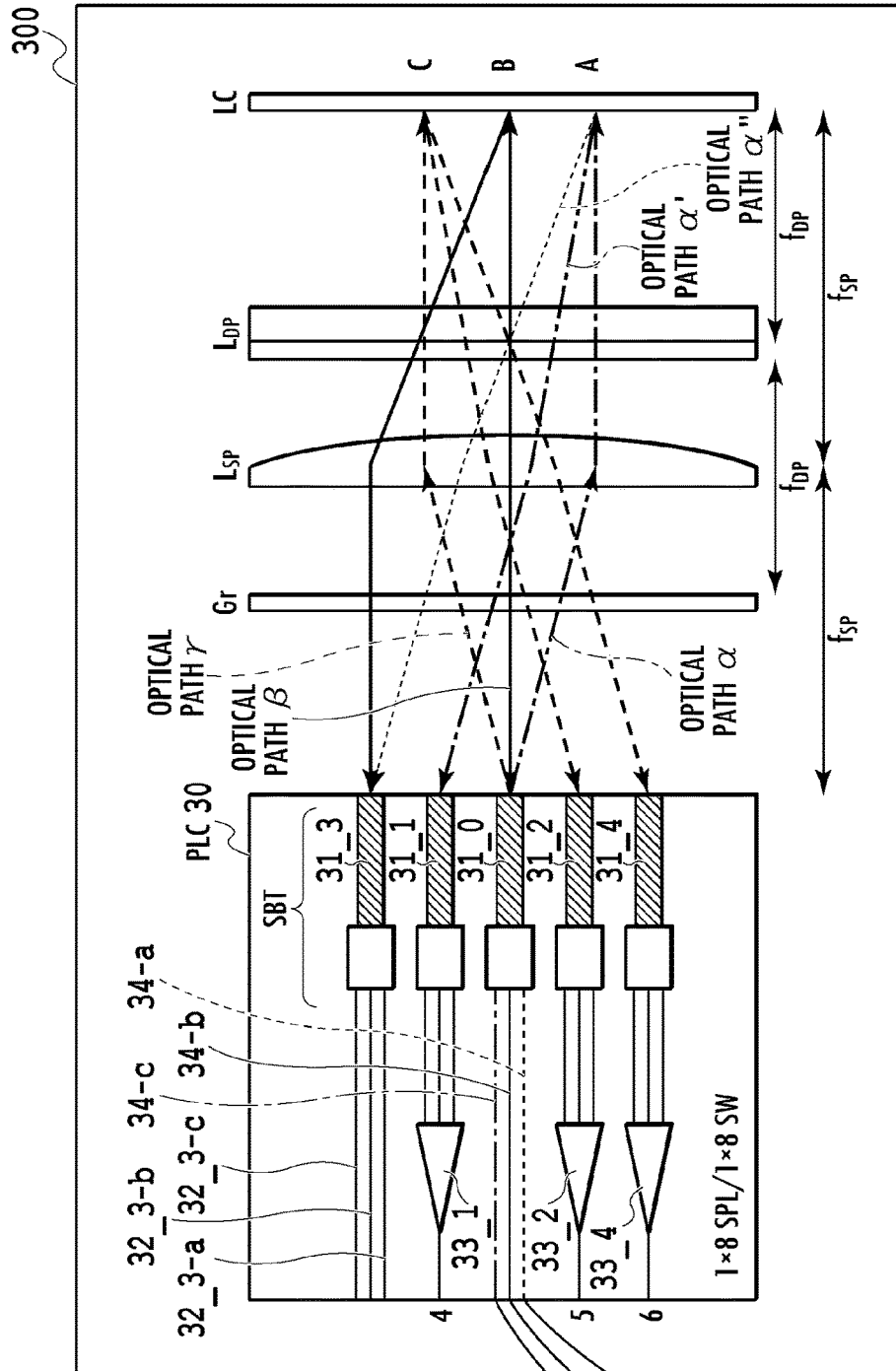
FIG. 6A is a diagram illustrating an outline of the configuration of an optical signal processing device according to Embodiment 4 of the present invention.
Figure 6B:
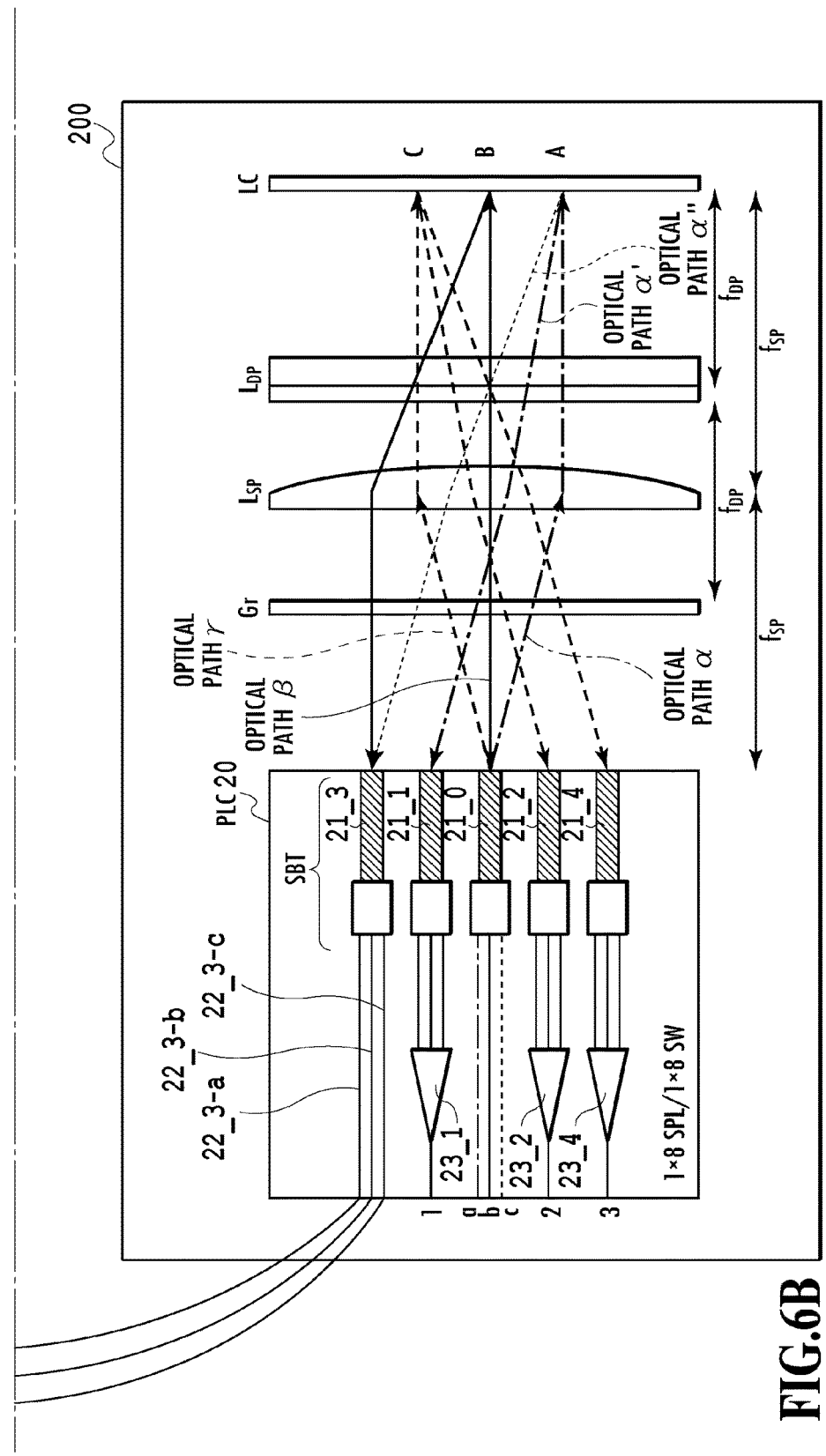
FIG. 6B is a diagram illustrating an outline of the configuration of the optical signal processing device according to Embodiment 4 of the present invention.

FIGS. 6A and 6B show an outline of the configuration of an optical signal processing device according to Embodiment 4 of the present invention. In this embodiment, first and second optical signal processing devices 200 and 300 are connected to increase the number N of outputs without increasing theoretical loss. The configurations of the first and second optical signal processing devices 200 and 300 are the same as that of the optical signal processing device of Embodiment 1, except for a few configurations. Differences from Embodiment 1 will only be discussed below.

The first and second optical signal processing devices 200 and 300 of this embodiment each have the SBT circuits of Embodiment 1 except for the multiplex part 13_3, and intermediate output waveguides 22_3-a, 22_3-b, and 22_3-c, or 32_3-a, 32_3-b, and 32_3-c which would otherwise correspond to the multiplex part 13_3 are used directly as output ports.

Optical fibers 24-a, 24-b, and 24-c are connected to the intermediate output waveguides 22_3-a, 22_3-b, and 22_3-c in the PLC 20 of the first optical signal processing device 200. The other ends of the optical fibers 24-a, 24-b, and 24-c are connected to input waveguides 34-a, 34-b, and 34-c in the PLC 30 of the second optical signal processing device 300.

The first optical signal processing device 200 is set to route signals to the SBT 21_3, and outputs from the SBT 21_3 are connected to the second optical signal processing device 300. With such a configuration, even when the number of the output ports of the first optical signal processing device 200 is N (N=3 in this example), the number of outputs can be increased without any theoretical loss.

In the example configuration shown in FIGS. 6A and 6B, two optical signal processing devices are combined to increase the number N of output ports from three to six. It is also possible to further increase the number of output ports by setting the second optical signal processing device 300 to route signals to the intermediate output waveguides 32_3-a, 32_3-b, and 32_3-c of the second optical signal processing device 300 and connecting the second optical signal processing device 300 to a third optical signal processing device.

The number of output ports can be increased also by taking intermediate output waveguides connected to an SBT of the first optical signal processing device 200 other than the SBT 21_3 and using these intermediate output waveguides directly as outputs, and then adding an optical signal processing device to these intermediate output waveguides.

Although Embodiments 1 to 4 described above have shown examples where an LCOS is used as an optical deflection element, the optical deflection element is not limited to an LCOS, and may be any deflection means capable of controlling the deflection angle of an optical signal independently according to the region where the optical signal is inputted. A similar function can be achieved using, for example, a micro-mirror array configured with a micro-electro-mechanical system (MEMS) as the optical deflection element.

Embodiment 5

Figure 7:
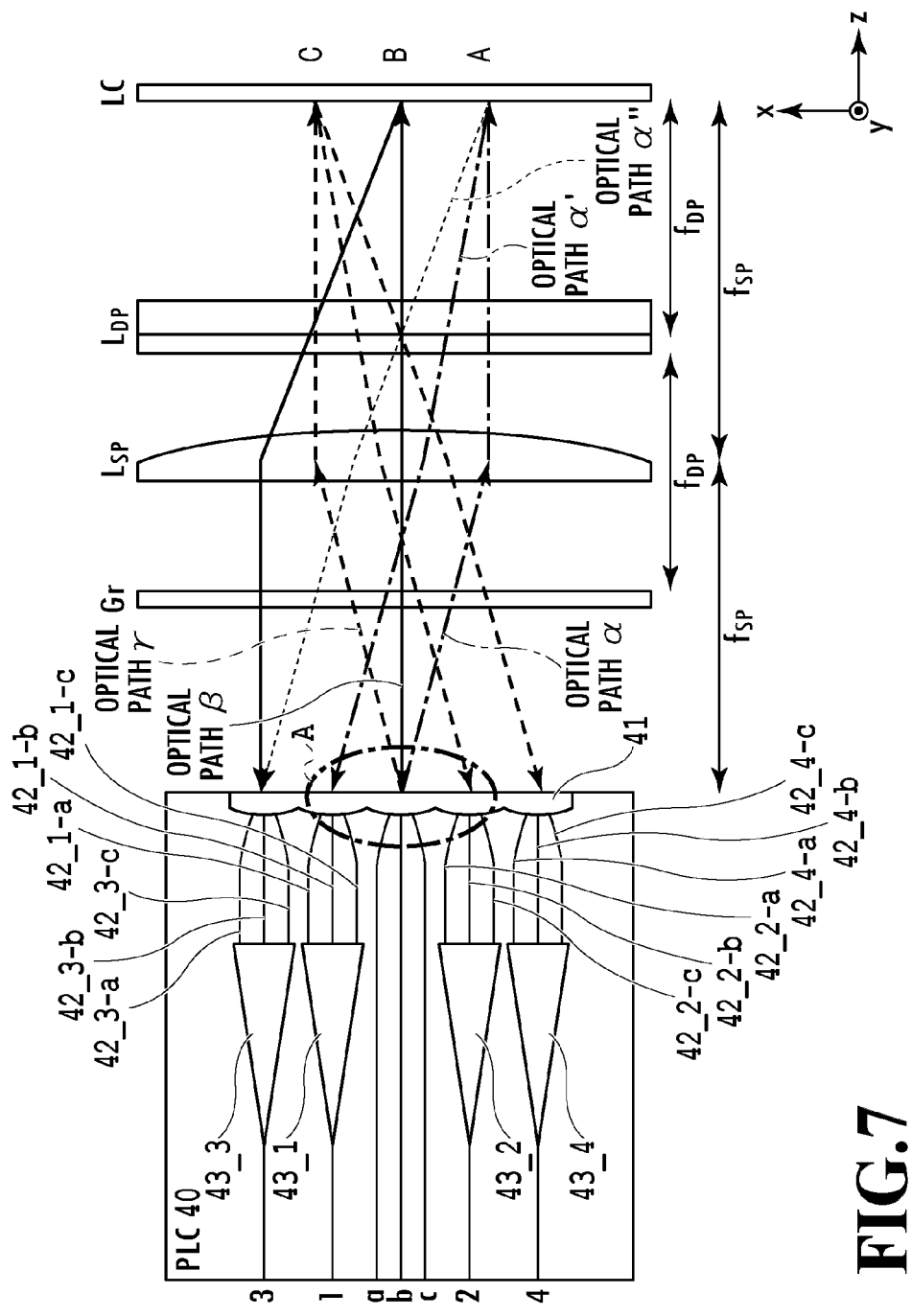
FIG. 7 is a diagram illustrating an outline of the configuration of an optical signal processing device according to Embodiment 5 of the present invention.

FIG. 7 shows an outline of the configuration of an optical signal processing device according to Embodiment 5 of the present invention. In the example described as Embodiment 1, an input/output optical system using SBT circuits is integrated on the PLC 10. The configuration of the input/output optical system is not limited to the one in Embodiment 1, and may be any other circuit configuration capable of outputting a beam of a desired diameter in a desired direction to the spatial system, such as one in Embodiment 5 formed by a slab waveguide and mode field converters. For example, the input/output optical system may be formed by components such as lenses and an optical fiber array. On the other hand, as described in the above embodiments, integration of the input/output optical system onto the PLC 10 is advantageous in its capability of eliminating the need to adjust the optical alignment of the input/output optical system. Another advantage is that the SBT circuits can be flexibly formed using photolithography, which is favorable in terms of mass production. As described, integration of the input/output optical system using the SBT circuits onto the PLC 10 has many advantages. In Embodiment 5, an optical signal processing device having an input/output optical system using straight waveguides.

In FIG. 7, optical signals are inputted to input waveguides a, b, and c in a PLC 40. For instance, an optical signal inputted through the input waveguide c travels through a slab waveguide 41 and is outputted to the spatial optical system.

Figure 8:
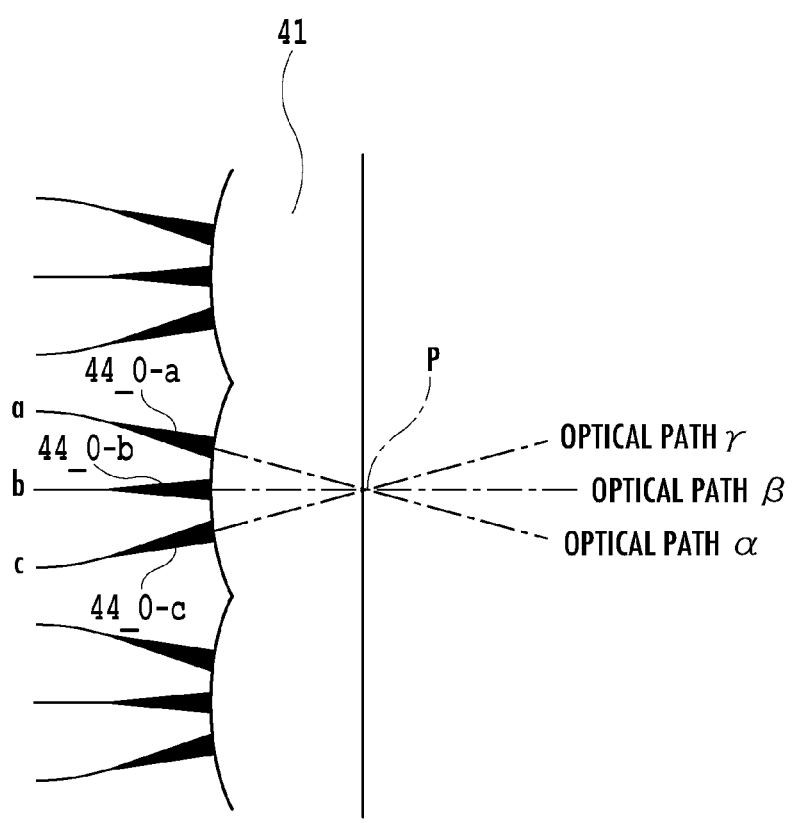
FIG. 8 is an enlarged view of an output part A to a spatial optical system, the output part A encircled by a dotted-line in FIG. 7.

FIG. 8 shows an enlarged view of an output part A to the spatial optical system, the output part A being encircled by the dotted line in FIG. 7. In FIG. 8, the input waveguides a, b, and c are connected to the slab waveguide 41, and optical signals are outputted to the spatial optical system after travelling through the slab waveguide 41. The orientations of the input waveguides a, b, and c on the x-z plane are set so that the principal rays (central rays) of the respective optical signals outputted from the input waveguides a, b, and c may intersect at a given point P and coincide with optical paths α, β, and γ, respectively.

Mode field converters 44_0-*a*, 44_0-*b*, and 44_0-*c* are placed at the ends of the input waveguides a, b, and c connected to the slab waveguide 41 so that the diameters of the output beams may be set to desired widths on the board plane of the PLC 40. These mode field converters may be formed using tapered waveguides or segmented structures that gradually change in thickness or width toward the spatial optical system side. The mode field converters are similarly disposed on intermediate output waveguides 42_1-*a* to 42_1-*c*, 42_2-*a* to 42_2-*c*, 42_3-*a* to 42_3-*c*, and 42_4-*a* to 42_4-*c*.

An optical signal outputted to the spatial optical system, for instance the optical signal propagating along the optical path γ, passes through the components of the spatial optical system, is deflected by the LCOS, propagates back to the PLC 40, and then is incident on, for example, the intermediate output waveguide 42_2-*c*, as in Embodiment 1. The optical signal is then emitted to the output 2 via an optical multiplex part 43_2.

The optical signal processing device of Embodiment 5 achieves a desired emission angle and direction using not the SBT circuits of Embodiment 1, but a simple straight circuit.

In the optical signal processing devices of Embodiments 1 to 5, the input ports and the output ports may be interchanged, i.e., optical signals may be inputted through the output ports and outputted through the input ports, to be used as a broadcast-and-select optical cross-connect. In such a case, the multiplex parts 13, 23, 33, and 43 function as shunts.

REFERENCE SIGNS LIST

10, 20, 30, 40 PLC
11, 21, 31 SBT
12, 22, 32, 42 intermediate output waveguide
13, 23, 33, 43 multiplex part
41 slab waveguide
44 mode field converter
Gr diffraction grating
Lsp, Ldp cylindrical lens
LC LCOS
141 to 143 1×2 optical coupler
151 to 153 MZI optical switch
161 to 163 control heater
200, 300 optical signal processing device

The invention claimed is:
1. An optical signal processing device, comprising:
M input ports (where M is an integer of 2 or more);
a first spatial beam transformer that emits optical signals inputted to the M input ports, from a single point of an output end in directions different for the respective input ports;
a deflector capable of deflecting optical signals emitted from the first spatial beam transformer according to which of incident regions on the deflector the optical signals have been incident on;
N second spatial beam transformers (where N is an integer of 2 or more) that each demultiplex an optical signal emitted from the deflector into M waveguides according to an angle of incidence;
N or less optical multiplex units that each multiplexes optical signals from the M waveguides of each of the second spatial beam transformers and output the multiplexed optical signal from a single output port,
a wavelength disperser disposed between the first spatial beam transformer and the deflector, and
the optical signals subjected to wavelength demultiplexing by the wavelength disperser are incident on different regions on the deflector according to their respective wavelengths.

2. The optical signal processing device according to claim 1, wherein:
the first and second spatial beam transformers each include
a slab waveguide formed on a planar lightwave circuit, and
a waveguide array formed by a plurality of waveguides of substantially the same length.

3. The optical signal processing device according to claim 1, wherein:
the first and second spatial beam transformers each include
a slab waveguide formed on a planar lightwave circuit, and
M optical waveguides connected to the slab waveguide and oriented in such directions as to cause a beam emitted from the slab waveguide to be incident on the incident regions of the deflector.

4. The optical signal processing device according to claim 1, wherein each of the optical multiplex units includes a plurality of multiplexers formed on a planar lightwave circuit and connected in stages.

5. The optical signal processing device according to claim 1, wherein:
when the number of optical multiplex units is N−1 or less, the M optical waveguides connected to the second spatial beam transformers to which no optical multiplex unit is connected are connected to M input ports of another optical signal processing device that is identical to the optical signal processing device.

6. An optical signal processing device, comprising:
M input ports (where M is an integer of 2 or more);
a first spatial beam transformer that emits optical signals inputted to the M input ports, from a single point of an output end in directions different for the respective input ports;
a deflector capable of deflecting optical signals emitted from the first spatial beam transformer according to which of incident regions on the deflector the optical signals have been incident on;
N second spatial beam transformers (where N is an integer of 2 or more) that each demultiplex an optical signal emitted from the deflector into M waveguides according to an angle of incidence;
N or less optical multiplex units that each selects an optical signal emitted from at least one of the M waveguides of each of the second spatial beam transformers and output the selected optical signal from a single output port,
a wavelength disperser disposed between the first spatial beam transformer and the deflector, and
the optical signals subjected to wavelength demultiplexing by the wavelength disperser are incident on different regions on the deflector according to their respective wavelengths.

7. The optical signal processing device according to claim 6, wherein:
the first and second spatial beam transformers each include
a slab waveguide formed on a planar lightwave circuit, and
a waveguide array formed by a plurality of waveguides of substantially the same length.

8. The optical signal processing device according to claim 6, wherein:
the first and second spatial beam transformers each include
a slab waveguide formed on a planar lightwave circuit, and
M optical waveguides connected to the slab waveguide and oriented in such directions as to cause a beam emitted from the slab waveguide to be incident on the incident regions of the deflector.

9. The optical signal processing device according to claim 6, wherein:
each of the optical multiplex units includes a plurality of multiplexers formed on a planar lightwave circuit and connected in stages.

10. The optical signal processing device according to claim 6, wherein:
when the number of optical multiplex units is N−1 or less, the M optical waveguides connected to the second spatial beam transformers to which no optical multiplex unit is connected are connected to M input ports of another optical signal processing device that is identical to the optical signal processing device.

11. An optical signal processing device, comprising:
M first input/output ports (where M is an integer of 2 or more);
a first spatial beam transformer that includes M second input/output ports connected to the M first input ports and a first input/output terminal that emits optical signals from a single point of an output end in directions different for the respective second input/output ports;
N second spatial beam transformers (where N is an integer of 2 or more) that each include M third input/output ports and a second input/output terminal that emits optical signals in directions different for the respective third input/output ports;
N or less optical multiplex/demultiplex units that each include fourth input/output ports connected to the M third input/output ports of a corresponding one of the second spatial beam transformer and one fifth input/output port;
a deflector capable of deflecting optical signals emitted from the first input/output terminal of the first spatial beam transformer and the second input/output terminal of each of the second spatial beam transformers according to which of incident regions on the deflector the optical signals have been incident on, and capable of optically connecting the first spatial beam transformer and the second spatial beam transformers to each other,
a wavelength disperser disposed between the first spatial beam transformation means and the deflector, and
the optical signals subjected to wavelength demultiplexing by the wavelength disperser are incident on different regions on the deflector according to their respective wavelengths.

12. The optical signal processing device according to claim 11, wherein:
the first and second spatial beam transformers each include
a slab waveguide formed on a planar lightwave circuit, the slab waveguide having the second or third input/output ports, and
a waveguide array formed by a plurality of waveguides of substantially the same length.

13. The optical signal processing device according to claim 11, wherein:
the first and second spatial beam transformers each include
a slab waveguide formed on a planar lightwave circuit, and
M optical waveguides connected to the slab waveguide and oriented in such directions as to cause a beam emitted from the slab waveguide to be incident on the incident regions of the deflector.

14. The optical signal processing device according to claim 11, wherein:
each of the optical multiplex units includes a plurality of multiplexers formed on a planar lightwave circuit and connected in stages.

15. The optical signal processing device according to claim 11, wherein:
when the number of optical multiplex units is N−1 or less, the M third input/output ports of the second spatial beam transformers to which no optical multiplex/demultiplex unit is connected are connected to M first input/output ports of another optical signal processing device that is identical to the optical signal processing device.

* * * * *